United States Patent Office 2,992,216
Patented July 11, 1961

---

2,992,216
$\Delta^{4,6}$-3-KETO STEROID COMPOUNDS
Eugene J. Agnello and Gerald D. Laubach, Jackson Heights, N.Y., assignors to Chas. Pfizer & Co., Inc., New York, N.Y., a corporation of Delaware
No Drawing. Filed Jan. 11, 1957, Ser. No. 633,538
5 Claims. (Cl. 260—239.55)

This invention is concerned with a process for converting 3-keto-6-dihydro-$\Delta^4$ steroid compounds to the corresponding 3-keto-$\Delta^{4,6}$ steroid compounds, by a highly selective method.

This invention is particularly concerned with a method whereby a variety of steriod compounds, saturated at the 6,7 position and having at the 3-position a keto group and at the 4,5-position a double bond, are converted into the corresponding compounds having at the 3-position a keto group and at both the 4,5 and 6,7 position double bonds. The starting materials utilized for the present process are known compounds and these may be obtained by a variety of procedures described in the chemical literature and in textbooks on steroid chemistry. The 3-keto-$\Delta^4$ steriod compounds used as starting material may be substituted at various positions of the steroid molecule with a variety of groups; for instance, the starting material used for the present process may be substituted at the 11-position with an oxygen function such as an hydroxyl group or a keto group. The reactants may be substituted at the 17-position with an hydroxyl group and/or an alkyl group or a substituted alkyl group such as the

radical. Either hydroxyl or acyl groups may occur at the 17-position. When compounds of the pregnane series are used, the 21-position of the pregnane-type side chain may be substituted with an hydroxyl or acyloxy group. Double bonds may occur at various positions other than at the 4,5 and 6,7 positions of the molecule and these do not interfere with the reaction. For instance, a 1,2 double bond and/or a 14,15 double bond may be present in the steroid reactant. Alternatively, the starting steriod may be a 14,15-expoxide or a 14-hydroxy substituted compound. Among the compounds which may be used as starting materials in the present process are progesterone, prednisolone, prednisone, hydrocortisone, cortisone, 14-hydroxyhydrocortisone, 14-hydroxycortisone, 14-hydroxyprogesterone, 14-hydroxyprednisolone, desoxycorticosterone, $\Delta^{14}$-hydrocortisone, $\Delta^{14}$-cortisone, 14,15-epoxidocortisone, 14,15-epoxidohydrocortisone, and esters of these.

It has been determined that this selective dehydrogenation can be effected by contacting a 3-keto-6-dihydro-$\Delta^4$-steroid with a quinone having an oxidation-reduction potential of less than about $-0.5$, utilizing a certain type of inert organic solvent system and an elevated temperature between about 70° and 190° C. The preferred organic solvents are those having a boiling point of at least 70° C. and those which have relatively high polarity. Particularly useful are mono-nuclear aromatic hydrocarbons, mono-nuclear halogenated aromatic hydrocarbons, oxygenated polar aliphatic organic solvents and oxygenated polar alicyclic organic solvents. Examples of these are tertiary butanol, n-amyl alcohol, hexanol, isoamyl alcohol, heptanol-3, cyclohexanol, ortho-dichlorobenzene, xylene, tertiary amyl alcohol, secondary amyl alcohol, benzene, toluene, acetic acid, propionic acid, butyric acid, ethyl acetic acid, methyl acetic acid, and esters of these acids such as butyl acetate, amyl acetate, hexyl acetate, butyl propionate, propyl propionate, amyl propionate, etc.

Useful quinones are those which under standard conditions have oxidation-reduction potentials of less than $-0.5$, and preferably those having potentials of $-0.65$ or less. Oxidation-reduction potentials are readily determined, of course, by reference to any scientific text. (See "Handbook of Chemistry and Physics," 31st ed., page 1442, Chemical Rubber Company, 1949, and Latimer and Hildebrand, "Reference Book of Inorganic Chemistry," rev. ed., pages 474–481, MacMillan Co., 1940.) Quinone itself, also known as benzoquinone, chloranil or tetrachloroquinone, toluquinone or methyl quinone, 1,2-naphthoquinone, hydroquinone and xyloquinone or dimethyl quinone have been particularly successfully employed in the new process. The type of quinone chosen is in part interdependent with the character of the solvent and the reaction temperature. Thus, with the more highly polar materials a quinone of lower oxidation-reduction potential may be employed satisfactorily. It is generally not advisable to operate at greater than 190° C., because of possible decomposition of the steroids. However, higher boiling solvents may be used, but at a temperature below 190° C. It is also preferable to employ a temperature of at least 70° C. in order to obtain useful yields, hence a solvent boiling at less than 70° should not be chosen.

It has been found, furthermore, that the selective dehydrogenation of this invention may be so controlled that a double bond is not only introduced at the 6,7-position, but also at the 1,2-position if the steroid reactant is a 1,2-dihydro compound. This control is effected by interrelating the temperature of the reaction mixture, the choice of solvent and the relative proportions of the quinone and the steroid reactant. For instance, employing an oxygenated polar aliphatic organic solvent such as an alkanol, e.g. tertiary butanol, at its boiling point (80° C.), hydrocortisone is converted to $\Delta^6$-dehydrohydrocortisone by contact with chloranil, regardless of the ratio of this quinone to the hydrocortisone. If two moles of chloranil are used per mole of the steroid in n-amyl alcohol at its boiling point, the product is primarily the $\Delta^6$ compound with a smaller amount of $\Delta^{1,6}$-bis dehydrohydrocortisone. Under these same conditions, however, if a larger excess of chloranil, e.g. 3–6 moles, is employed, the product is predominantly the $\Delta^{1,6}$ compound. On the other hand, contacting the steriod in xylene with 6 moles of chloranil produces only the $\Delta^6$ product.

Prior art methods that have been used for introduction of a double bond at the 6,7-position of the steroid molecule have not the many advantages of the present process. For instance, the present process occurs in a single reaction step and does not require two steps such as bromination and dehydrobromination which has heretofore been used for the introduction of a double bond at this position of the steriod molecule. In the present method the 3-keto-$\Delta^4$ steroid compound is simply contacted with the quinone, in a solvent medium of the stipulated type, within the specified elevated temperature range. This brings about the direct dehydrogenation to the desired 3-keto-$\Delta^{4,6}$ steroid compounds, and may also concurrently effect 1,2-dehydrogenation.

A variety of known compounds and certain new compounds may be prepared by the present process. The new compounds from the corresponding 3-keto-$\Delta^4$ compounds which are prepared by the present process may be indicated by the following structural formulas. (Compounds III and VI are formed from the corresponding $\Delta^4$ or $\Delta^{1,4}$-14,15-epoxides or from the $\Delta^4$ or $\Delta^{1,4}$-14-hydroxy-15-bromo compounds which are prepared by the method of U.S. patent application Serial 459,848, filed October 1, 1954.)

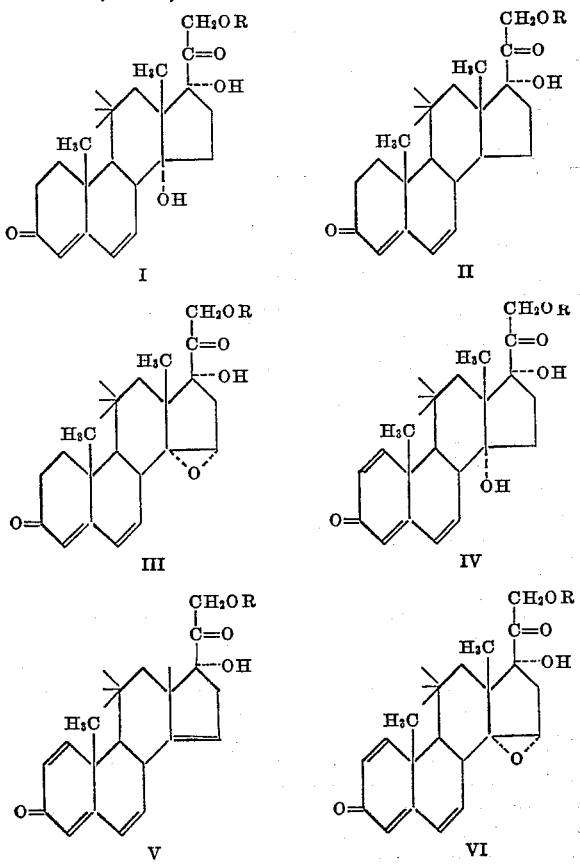

In the above structures Y is

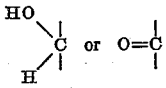

R is hydrogen or a carboxylic acid group having from 1 to 10 carbon atoms in its chain; e.g. acetyl, propionyl, butyryl, benzoyl, phenylacetyl, etc.). In other words the new compounds may be designated $\Delta^{4,6}$-pregnadiene- and $\Delta^{1,4,6}$-pregnatriene - 11$\beta$,14$\alpha$,17$\alpha$,21 - tetrol-3,20 - diones; $\Delta^{4,6}$-pregnadiene- and $\Delta^{1,4,6}$-pregnatriene-14$\alpha$,17$\alpha$, 21-triol-3,11,20-triones; $\Delta^{4,6}$-pregnadiene- and $\Delta^{1,4,6}$-pregnatriene-11$\beta$,17$\alpha$,21-triole-3,20-dione-14,15-epoxides; $\Delta^{4,6}$-pregnadiene- and $\Delta^{1,4,6}$-pregnatriene-17$\alpha$,21-diol-3,11,20-trione-14,15-epoxides; $\Delta^{4,6,14}$-pregnatriene- and $\Delta^{1,4,6,14}$-pregnatetrene-11$\beta$,17$\alpha$,21-triol-3,20 - diones; and $\Delta^{4,6,14}$-pregnatriene- and $\Delta^{1,4,6,14}$-pregnatetrene-17$\alpha$,21-diole-3,11, 20-triones; and their 21-hydrocarbon carboxylic acid esters having between one and ten carbons in the acyl chain. Starting materials for preparing these products are described in U.S. Patent 2,745,784, issued May 15, 1956, and in the copending patent applications Serial Number 432,314, filed May 25, 1954, and Serial Number 459,848, filed October 1, 1954.

These new products show activity as steroid cortical hormone-type compounds; that is, they possess anti-inflammatory action when administered to animals, including humans. Some are more active than others. For instance, these substances, when administered by the oral, intramuscular or intra-articular route, are effective in reducing inflammation due to such conditions as rheumatoid arthritis. They may also be applied topically to reduce inflammation due to various infectious processes; for instance, these substances are highly effective in reducing the inflammation due to poison ivy. They may be administered topically in the form of ointments or salves in suitable bases familiar to those in the pharmaceutical manufacturing art. They also may be injected intra-articularly as suspensions in water or in saline solution.

In the operation of this new process the compound which is to be used as starting material, that is, the 3-keto-6-dihydro-$\Delta^4$ steroid, is placed in the organic solvent with at least about one mole of the quinone per mole of the steroid compound used as starting material. The mixture is then heated, preferably at a temperature of between about 70° and 190° C., and, most conveniently, at the boiling point of the solvent if it boils within this range. The reaction may be conducted under an atmosphere of an inert gas such as nitrogen to reduce decomposition of the starting material and product to the minimum. Refluxing is continued for several hours; that is, from about two to about thirty hours, depending upon the particular compound used as starting material and the other conditions under which the reaction is run. The product formed by the dehydrogenation reaction may be isolated from the resulting solvent solution by various methods. Most conveniently, the solvent may be removed by concentration under vacuum and the solid product is then isolated from the residue. Alternatively, a solvent having a somewhat lower boiling point in which the product is soluble, for instance, chloroform, methylene chloride, carbon tetrachloride, and so forth may be added. The mixture may then be washed with an aqueous solution of a reducing agent such as sodium hydro-sulfite and then with dilute sodium hydroxide to remove the reduction product of the quinone. The solvent solution is then dried, for instance, over an anhydrous solid salt, such as sodium sulfate. The solution is then concentrated under vacuum to obtain the solid product.

This application is in part a continuation of our copending application Serial No. 526,554 filed August 4, 1955.

The following examples are given by way of illustration and are not to be regarded as a limitation of this invention, many variations of which are possible without departing from its spirit or scope.

EXAMPLE I $\Delta^6$-dehydrohydrocortisone acetate 808 milligrams of hydrocortisone acetate and 900 milligrams of chloranil were added to 72 milliliters of xylene. The mixture was refluxed under an atmosphere of nitrogen for 18 hours. The reaction mixture was then diluted with 150 milliliters of chloroform. The solvent solution was washed with several small portions of 5% sodium hydroxide solution and then with water. It was then dried over anhydrous sodium sulfate. The anhydrous salt was removed after several hours. The filtered solution was concentrated under vacuum and the product was obtained as an amorphous solid. This was triturated with ether to obtain a crystalline product. One hundred milligrams of crystalline product was filtered and dried under vacuum at room temperature. This product melted at 198° to 200° C. The optical rotation $[\alpha]_D^{25}$ in dioxane solution was +185.2°. The ultraviolet absorption maximum of the product in ethanol at 283 m$\mu$ was $\epsilon$=23,00.

EXAMPLE II $\Delta^6$-dehydroprogesterone 628 milligrams of progesterone and 980 milligrams of chloranil were added to 15 milliliters of toluene. The mixture was refluxed under an atmosphere of nitrogen for a period of 20 hours. The product was then isolated as described in the example directly above. One hundred seventy milligrams of crystalline product were isolated. This product exhibited an ultraviolet absorption maximum in ethanol at 283 m$\mu$ of $\epsilon$=25,000.

EXAMPLE III

$\Delta^6$-14-hydroxyhydrocortisone propionate

The process described in Example I was repeated using 14-hydroxy-hydrocortisone propionate (prepared by the method described in the aforesaid U.S. Patent 2,745,784). The corresponding $\Delta^{4,6}$ compound was obtained.

EXAMPLE IV

$\Delta^6$-dehydrocortisone acetate

The process described in Example I was repeated, utilizing cortisone acetate. The product that was obtained was $\Delta^6$-dehydrocortisone acetate with a melting point of 237°–238° C. Its rotation in dioxane solution was $[\alpha]_D^{25}+262°$. The ultraviolet absorption maximum of the product occurred at 280 m$\mu$. The ester obtained by this procedure was hydrolyzed by treatment in a mixture of methanol and water with potassium carbonate. From the reaction mixture there was isolated $\Delta^6$ dehydrocortisone.

EXAMPLE V

$\Delta^6$-dehydro-17-hydroxydesoxycorticosterone-diacetate

A sample of 17-hydroxydesoxycorticosterone-diacetate was treated as described in Example I. From the reaction mixture was isolated $\Delta^6$-dehydro-17-hydroxydesoxycorticosterone-diacetate. This product had a melting point of 208°–209° C. In dioxane solution it had an optical rotation of $[\alpha]_D^{25}+39°$. It displayed a maximum in the ultraviolet absorption at 282 m$\mu$.

EXAMPLE VI

$\Delta^6$-dehydrodesoxycorticosterone acetate

Desoxycorticosterone acetate was treated as described in Example I, utilizing ortho-dichlorobenzene as the solvent. The product that was isolated was shown to be identical with the known compound $\Delta^6$-dehydrodesoxycorticosterone acetate. It had a melting point of 108–110° C. The optical rotation was $[\alpha]_D^{25}+195°$ in ethanol. In ethanol it displayed an ultraviolet absorption maximum at 282 m$\mu$ of $\epsilon=20,000$.

The acetate was hydrolyzed in a mixture of methanol and water containing potassium carbonate, and the free alcohol was isolated. This proved identical with known $\Delta^6$-dehydrodesoxycorticosterone. It had a melting point of 121°–123° C. and an optical rotation in dioxane of $[\alpha]_D^{25}+168°$. The ultraviolet absorption maximum was $\epsilon=24,700$ at 284 m$\mu$ in ethanol.

EXAMPLE VII

$\Delta^{4,6,14}$-pregnatriene-11$\beta$,17$\alpha$,21-triol-3,20-dione acetate A portion of $\Delta^{14}$-dehydrohydrocortisone acetate was heated at reflux for 20 hours in xylene containing chloranil. The resulting mixture was diluted with an equal volume of chloroform and the solution was washed first with an aqueous solution of sodium hydrosulfite and then with diluted aqueous sodium hydroxide and finally with water. The solution was dried over anhydrous sodium sulfate. This was filtered and the solvent solution was concentrated under vacuum to obtain an amorphous brown solid. On trituration with ether there was obtained a purified product. This material displayed an ultraviolet absorption at 282 m$\mu$ and a polarity on a papergram slightly greater than that of $\Delta^{14}$-dehydrohydrocortisone acetate.

EXAMPLE VIII

$\Delta^{6,14}$-didehydrocortisone acetate

The process described in the example above was repeated, utilizing $\Delta^{14}$-dehydrocortisone in ortho-dichlorobenzene as the solvent. The product that was isolated, $\Delta^{6,14}$-bis-dehydrocortisone acetate, melting at 198°–200° C. with decomposition. It had an optical rotation in dioxane of $[\alpha]_D+141°$. At 281 m$\mu$ it displayed an ultraviolet absorption of $\epsilon=21,000$.

EXAMPLE IX

$\Delta^6$-dehydro-14,15-$\alpha$-epoxidocortisone acetate 14,15-$\alpha$-epoxidocortisone acetate was treated with chloranil in boiling ortho-dichlorobenzene for a period of 15 hours. The product was isolated as described. The recovered material had a melting point of 179–180° C. with decomposition. In ethanol solution it displayed an ultraviolet absorption maximum at 278 m$\mu$ of $\epsilon=24,000$.

EXAMPLE X

$\Delta^6$-dehydro-14$\alpha$,15$\alpha$-epoxidohydrocortisone acetate

14$\alpha$,15$\alpha$-epoxidohydrocortisone acetate was heated in a mixture of xylene and chloranil at the boiling point for a period of 24 hours. At the completion of the reaction the product was isolated. It displayed a characteristic ultraviolet absorption maximum at 280 m$\mu$ and a higher polarity on paper chromatograms. The product was mixed with starting material.

EXAMPLE XI

$\Delta^6$-dehydro-14$\alpha$-hydroxycortisone acetate

A sample of 14$\alpha$-hydroxycortisone acetate was heated at the boiling point in ortho-dichlorobenzene containing chloranil for 15 hours. The product formed was then isolated as described in the example above. This material had a melting point of 245–247° C. with decomposition. It displayed a characteristic absorption maximum in ethanol at 282 m$\mu$ ($\epsilon=24,300$) and a greater polarity than the starting material on paper chromatograms. The melting point of the product was greater than 260° C., $[\alpha]_D^{20}+292°$ (0.3% in dioxane).

*Analysis.*—Calcd. for $C_{23}H_{28}O_7$: C, 66.3; H, 6.78. Found: C, 66.6; H, 6.89.

EXAMPLE XII

$\Delta^{6,14}$-bis-dehydrohydrocortisone acetate

This product was formed together with $\Delta^6$-dehydro-14$\alpha$-hydroxyhydrocortisone acetate by heating a mixture of 14$\alpha$-hydroxyhydrocortisone acetate and chloranil in xylene at the boiling point for a number of hours. The $\Delta^{6,14}$ product displayed a characteristic absorption maximum in the ultraviolet at 283 m$\mu$ and a characteristic mobility on paper chromatograms identical with that of the product of Example VII.

EXAMPLE XIII 25 g. of F acetate
45.7 g. of chloranil (oxid.-red. potential=—0.703)
1700 ml. t-BuOH This mixture was refluxed under nitrogen with stirring for three hours. It was then concentrated to 200 ml. on a hot plate, and excess chloranil filtered off. The mother liquor was taken up in 1½ liters of chloroform, and this solution was washed with 2×200 $H_2O$
4×200 5% NaOH
4×200 $H_2O$ The material was dried and concentrated to dryness, resulting in 21.4 g. of an ivory solid. This was triturated with 1:1 ether-ethyl acetate to give 18.9 g. of white crystals, determined by infrared analysis and papergram mobility to be $\Delta^6$-dehydro F acetate.

U.V. $\lambda_{max}^{alc.}$ 285 m$\mu$ ($\epsilon=26,000$)

EXAMPLE XIV 404 mg. F acetate
648 mg. 1,4-benzoquinone (oxid.-red. potential=—0.711)
35 ml. n-amyl alcohol This mixture was refluxed under nitrogen for 2 hours and then worked up as shown in Example XIII. The $\Delta^6$-dehydro F acetate was again obtained.

EXAMPLE XV 404 mg. F acetate
1.06 g. 2,6-dichloro-1,4-benzoquinone
(oxid.-red. pot.=—0.748)
35 ml. O-dichlorobenzene This system was refluxed under $N_2$ for 3 hours and again worked up as in Example XIII to obtain $\Delta^6$-dehydro F acetate.

EXAMPLE XVI 404 mg. F acetate
35 ml. n-amyl alcohol
1.48 g. chloranil

This was refluxed under $N_2$ for 3 hours, taken up in 50 ml. chloroform and filtered to remove excess chloranil. The filtrate was concentrated to dryness, and the residue taken up in chloroform (200 ml.) and washed with:

1×25 ml. $H_2O$
4×25 ml. 5% NaOH
6×25 ml. $H_2O$

After concentrating to dryness, the residue was triturated with 2:1 ethyl acetate ether to give 33 mg. pale yellow crystals with infrared, U.V. and papergram consistent with the properties of $\Delta^{1,6}$-bisdehydro F acetate which is described and claimed in our copending patent application Serial No. 605,479, filed August 22, 1956.

$\Delta^{1,6}$-bisdehydro-F acetate was again prepared in similar manner using heptanol-3 as solvent.

$\Delta^{1,6}$-bisdehydro-F acetate was also prepared in the same manner using prednisolone acetate as the starting material in place of the compound F acetate.

The same product was made by this process using $\Delta^6$-dehydro-F acetate as starting material.

EXAMPLE XVII 808 mg. F acetate
75 ml. n-amyl alcohol
900 mg. chloranil

This mixture was refluxed under $N_2$ overnight, and the material then taken up in 100 ml. $CHCl_3$ and washed:

5×20 ml. 5% NaOH
4×20 ml. $H_2O$

After concentrating to dryness, the residue was triturated with 1:1 ether-ethyl acetate and gave 244 mg. tan crystals, which infrared analysis established as $\Delta^6$-dehydro F acetate.

Using the same procedure with t-amyl alcohol, 3.75 g. chloranil and 1.0 g. of F acetate, $\Delta^6$-F acetate was the main product. About 10% of $\Delta^{1,6}$-bisdehydro F acetate was also obtained.

In a commercially available mixture of sec-amyl alcohols (B.P. 110–117°) the main product, using 6 meq. of chloranil, was again $\Delta^{1,6}$-bisdehydro F acetate.

EXAMPLE XVIII

A mixture of 12 g. of desoxycorticosterone, 16 g. of chloranil and 710 ml. of xylene was refluxed under nitrogen overnight. The reaction mixture was diluted with 500 ml. of benzene, washed with alkaline sodium hydrosulfite and water, and concentrated to a volume of 25 ml. in vacuo. The resultant concentrate was dissolved in 1:1 benzene-petroleum ether and chromatographed on acid-washed alumina. The fractions eluted with benzene-ether, ether, and ether-acetone contained the product which was detectable by its characteristic U.V. absorption spectrum ($\lambda$ max. 282 m$\mu$). The product, after trituration with acetone-petroleum ether, exhibited M.P. 104–106° and $\lambda_{max}^{EtOH}$ 282 ($\epsilon$=24,000)

and was identified as $\Delta^{4,6}$-pregnadiene-21-ol-3,20-dione.

EXAMPLE XIX

The procedure of Example XVIII was repeated three more times, employing respectively toluquinone, xyloquinone and 1,2-naphthoquinone, in lieu of the chloranil. In each instance the same $\Delta^{4,6}$-product was obtained.

EXAMPLE XX

One mole of prednisolone and one mole of benzoquinone were refluxed in cyclohexanol under nitrogen overnight. Upon filtration, concentration and recovery as above described, $\Delta^6$-dehydroprednisolone.

EXAMPLE XXI

One mole of compound F acetate and 6 moles of chloranil were refluxed 3¼ hours under nitrogen, using butyl acetate as the solvent. $\Delta^6$ F acetate was produced. When the experiment was repeated using respectively acetic acid, propionic acid, hexyl acetate, amyl butyrate and ethyl-acetic acid, in lieu of the butyl acetate, the same product was obtained.

EXAMPLE XXII 14-hydroxy-F acetate was heated with chloranil in tertiary butanol as described above. The product was $\Delta^6$-dehydro-14-hydroxy-F acetate. It had a melting point of 246–247° C., $[\alpha]_D^{24}$+230° (0.4%, dioxane), $\lambda$ max. in ethanol at 283 m$\mu$ $\epsilon$=24,800.

Analysis.—Calcd. for $C_{23}H_{30}O_7$: C, 66.0; H, 7.23. Found: C, 65.4; H, 7.20.

What is claimed is:

1. A compound chosen from the class consisting of $\Delta^{4,6}$ - pregnadiene - 11$\beta$,14$\alpha$,17$\alpha$,21 - tetrol - 3,20 - diones; $\Delta^{4,6}$ - pregnadiene - 14$\alpha$,17$\alpha$,21 - triol - 3,11,20 - triones; $\Delta^{4,6}$-pregnadiene- and $\Delta^{1,4,6}$ - pregnatriene - 11$\beta$,-17$\alpha$,21 - triol - 3,20 - dione - 14,15 - epoxides; $\Delta^{4,6}$ - pregnadiene- and $\Delta^{1,4,6}$ - pregnatriene - 17$\alpha$,21 - diol - 3,11,20-trione - 14,15 - epoxides; $\Delta^{4,6,14}$ - pregnatriene - and $\Delta^{1,4,6,14}$ - pregnatetrene - 11$\beta$,17$\alpha$,21 - triol - 3,20 - diones; and $\Delta^{4,6,14}$ - pregnatriene - and $\Delta^{1,4,6,14}$ - pregnatetrene-17$\alpha$,21 - diol - 3,11,20 - triones; and their 21 - hydrocarbon carboxylic acid esters having between one and ten carbons in the acyl chain.

2. A compound having the structure

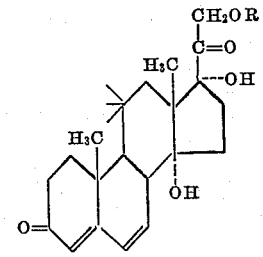

wherein Y is chosen from the group consisting of

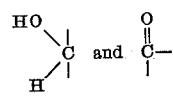

and R is chosen from the group consisting of hydrogen and a hydrocarbon acyl group having between one and ten carbons.

3. A compound having the structure

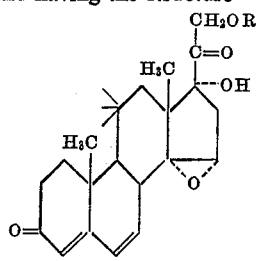

wherein Y is chosen from the group consisting of

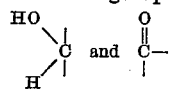

and R is chosen from the group consisting of hydrogen and a hydrocarbon acyl group having between one and ten carbons.

4. A compound having the structure

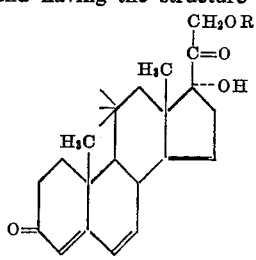

wherein Y is chosen from the group consisting of

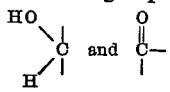

and R is chosen from the group consisting of hydrogen and a hydrocarbon acyl group having between one and ten carbons.

5. A compound having the structure

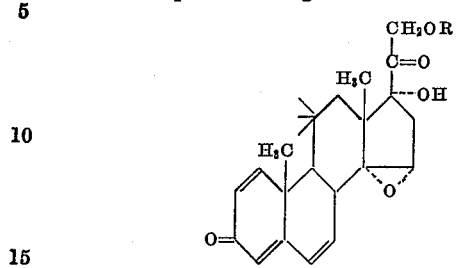

wherein Y is chosen from the group consisting of

and R is chosen from the group consisting of hydrogen and a hydrocarbon acyl group having between one and ten carbons.

References Cited in the file of this patent

UNITED STATES PATENTS

| 2,739,974 | Colton | Mar. 27, 1956 |
| 2,756,179 | Fried | July 24, 1956 |
| 2,882,282 | Agnello et al. | Apr. 14, 1959 |

OTHER REFERENCES

Fieser et al.: Organic Chemistry, third edition, 1956, pp. 710–712.

UNITED STATES PATENT OFFICE
Certificate of Correction

Patent No. 2,992,216  July 11, 1961

Eugene J. Agnello et al.

It is hereby certified that error appears in the above numbered patent requiring correction and that the said Letters Patent should read as corrected below.

Column 3, lines 3 to 37, formulas I to VI should appear as shown below instead of as in the patent:

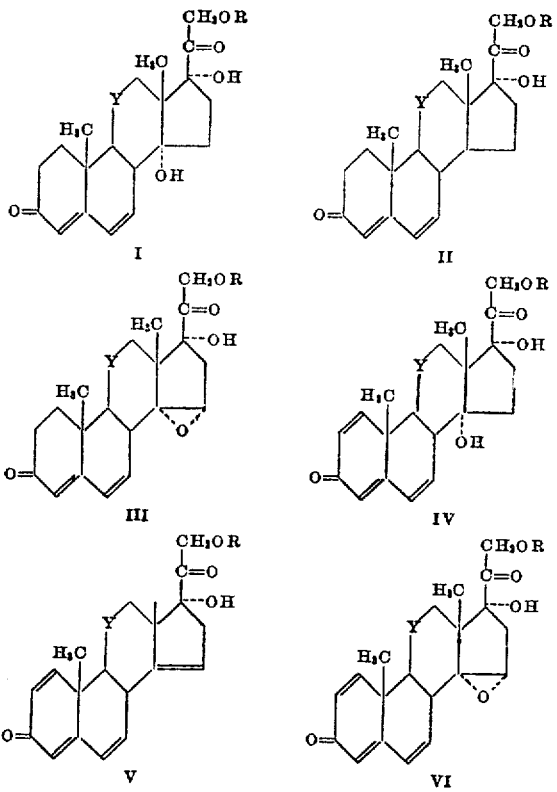

column 8, lines 54 to 64, the formula should appear as shown below instead of as in the patent:

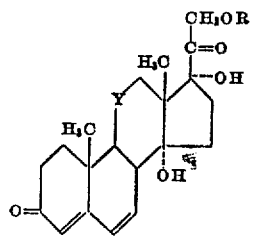

column 9, lines 2 to 11, the formula should appear as shown below instead of as in the patent:

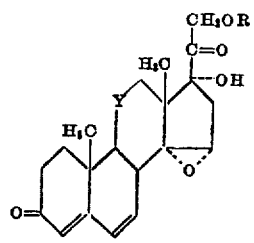

same column 9, lines 21 to 31, the formula should appear as shown below instead of as in the patent:

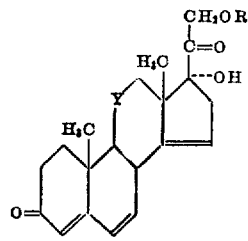

column 10, lines 6 to 15, the formula should appear as shown below instead of as in the patent:

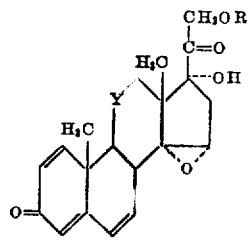

Signed and sealed this 20th day of February 1962.

[SEAL]
Attest:
ERNEST W. SWIDER,
*Attesting Officer.*

DAVID L. LADD,
*Commissioner of Patents.*